Nov. 1, 1949  K. E. BECKLEY  2,486,729
POULTRY-WATERING DEVICE
Filed June 25, 1948
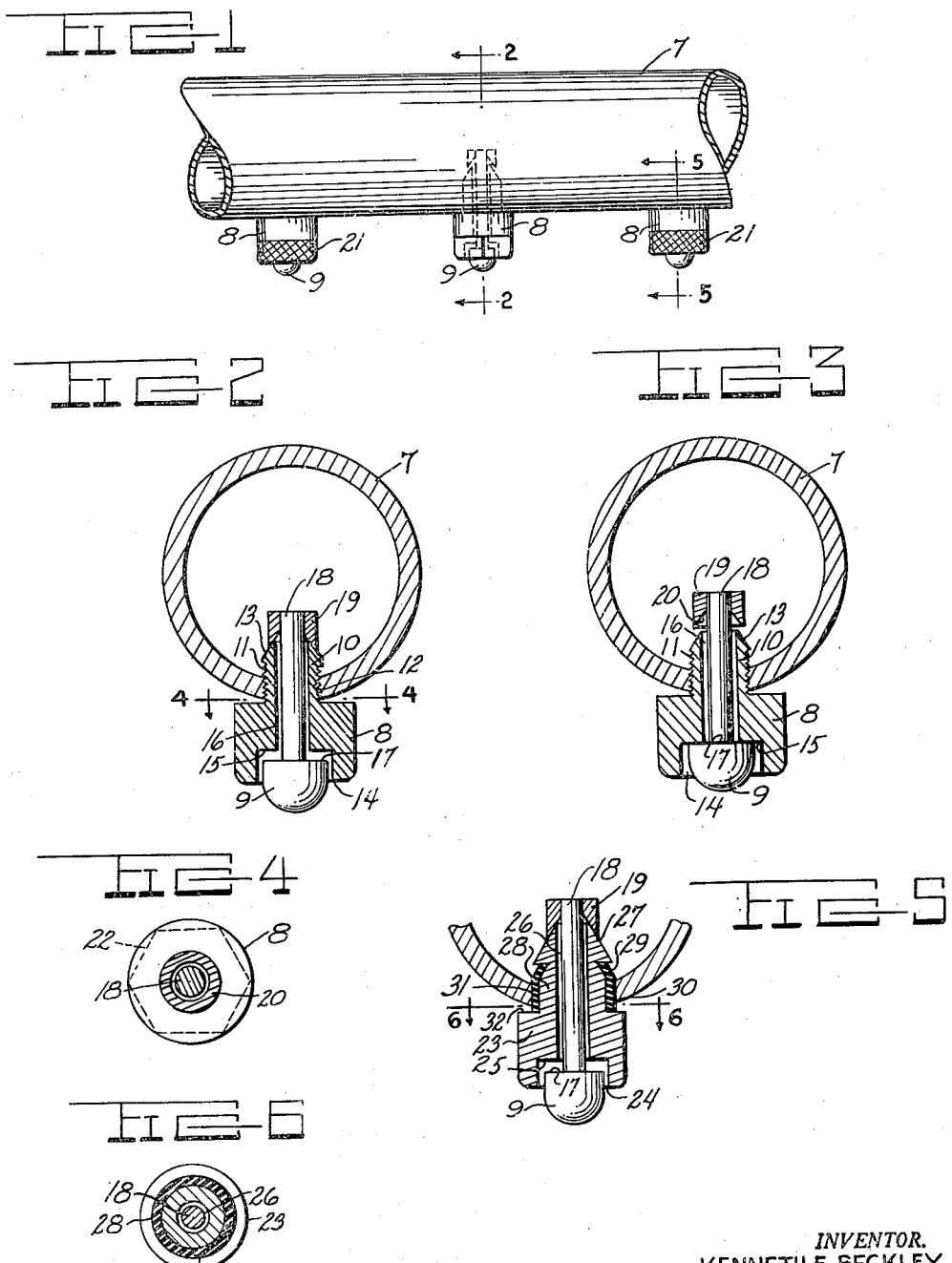
INVENTOR.
KENNETH E. BECKLEY
BY
McMorrow, Berman + Davidson
ATTORNEYS Patented Nov. 1, 1949

2,486,729

UNITED STATES PATENT OFFICE 2,486,729

POULTRY-WATERING DEVICE

Kenneth E. Beckley, Baldwin Park, Calif.

Application June 25, 1948, Serial No. 35,250

3 Claims. (Cl. 119—72.5)

1

This invention relates to poultry-watering devices, and particularly to a type of watering device or fountain operated by a fowl to supply the drinking water desired, by this fowl.

The main obect of my invention is to provide a watering or fountain device attached to a water-supply system which makes it possible for fowls and small animals to operate the device for drinking water therefrom by making contact therewith with the beak or mouth.

Another object is to provide a device of the indicated character which is readily connected to a water pipe for obtaining limited amounts of water therefrom.

A further object is to produce such a device which is simple in construction and certain to operate, and with such interior structure as to avoid being clogged with sediment from the pipe to which it may be connected.

It is also an object to have a watering device of this class which is compact and small in size, capable of being made in several forms, and economical to make so that it may be sold at a low figure to encourage wide adoption and general distribution.

Other objects and advantages of my invention will appear in further detail as the specification proceeds.

In order to facilitate ready comprehension of this invention for a proper appreciation of the salient features thereof, the invention is illustrated on the accompanying drawing forming part hereof, and in which:

Figure 1 is a fragmentary side elevation of a section of water pipe having several watering devices installed thereon which are made according to the invention and embodying the same in practical form;

Figure 2 is a vertical section of Figure 1, taken on line 2—2;

Figure 3 is a similar section showing the valve or watering device open in contrast with the closed condition thereof shown in Figure 2;

Figure 4 is a transverse section taken on line 4—4 in Figure 2;

Figure 5 is a fragmentary section showing a modification of the watering device;

Figure 6 is a transverse section taken on line 6—6 in Figure 5.

Throughout the views, the same reference numerals indicate the same or like parts.

On farms and in poultry yards wherever poultry are found, it is always an important matter to water the poultry or small animals according

2 to needs, aside from feeding them as required. Open trays of water are all to easily contaminated with dirt or spilled, or even crowded by too many fowls or animals around each tray, while the chore of frequently filling them with water is an unnecessary burden to the poultry raiser.

Upon considering this problem, it has occurred to me that it should be possible to arrange to have means connected to a water power system available which will automatically supply drinking water to poultry and small animals when desired without attention of any person being required. As a result, I have found it quite feasible to produce a special type of contact-operated device or valve adapted to be inserted into a water pipe for supplying requisite amounts of water to fowls or animals making contact with it, as will now be set forth in detail.

Hence, in the practice of my invention, and referring again to the drawing, a water pipe 7, preferably connected to a low-pressure water-supply system, as for example, to a water tank which is located at only a slight elevation above the pipe, is arranged horizontally and in the bottom thereof a series of holes are drilled which are fitted with a group of fixtures indicated at 8, 8 in such fashion that they depend from the pipe, while exposed below the bottom of each fixture is a contact portion 9, 9, etc., which, as will be explained, is sensitive to the contact of the beak of a fowl or the mouth of a small animal so as to cause a supply of water to issue from the device involved and be suspended upon the contact member in globules of water suspended therefrom.

As best seen in Figures 2, 3 and 4, each fixture 8 virtually constitutes a valve body which is substantially cylindrical at the lower end thereof which is exposed exteriorly of the pipe, but has an upwardly-projecting reduced portion 10 which is externally threaded at 11 engaging in a threaded hole 12 of the pipe and terminating at the top in a conical end 13 which for the present purpose forms a valve seat preferably disposed at an angle of substantially 60° to a horizontal. In the lower end of the fixture 8 is a cylindrical recess 14 which substantially forms a counterbore terminating in a shoulder 15 from which a hole 16 extends upwardly through the fixture and its reduced portion 10. The head 9 which forms a contact member against which the beak or mouth of the fowl or animal to be watered is to make contact terminates in a substantially flat shoulder 17, while extending upwardly therefrom is a reduced portion in the form of an integral rod 18 extending through hole 16 and a short distance above the same into the pipe 7, the shoulder 15 within fixture 8 forming a stop for the upper end or shoulder 17 of the contact member or head 9, while the latter with the rod 18 substantially forms a plunger which is movable a short distance up into the fixture as will now be explained.

Fixed upon the upper end of the plunger rod 18 is a valve head 19 having an internal conical contact surface 20 adapted to engage against the frusto-conical seat 13 of the reduced portion 10 of fixture 8, and therefore cooperating therewith to form a valve together with the fixture. The plunger rod 18 with its lower contact head 9 and the upper valve head 19 together form a valve member which serves as a closure for the hole 16 in the upper portion of fixture 8, the diameter of this hole being considerably greater than that of the plunger 18 and therefore allowing water to run down about the plunger when the head 19 is raised out of contact with the valve seat 13. The lower contact member or head 9 is designed to form a ballast for the valve member simultaneously with the feature of using it as a contact portion for opening the valve, so that it is manifest that if a fowl or small animal makes contact with the head 9, it will disturb the position of the valve plunger 9, 18, 19, as shown in Figure 3, and cause the same to be raised so that the upper shoulder 17 of the head 9 will make contact with the stop shoulder 15 of the recess 14, or will at least be raised sufficiently so that a space will appear between the inner contact surface 20 of valve head 19 and the valve seat 13 on reduced portion 10 of valve member 8, thus allowing water from pipe 7 to pass down through the hole 16 and gather upon the contact head 9 in the form of drops or globules of water which will be immediately taken up by the animal or fowl disturbing member 9 with its beak or mouth. As soon as the head 9 is allowed to freely drop into normal position, the upper valve head 19 will, of course, again seat upon valve seat 13 and close this valve structure until the valve plunger is again lifted or disturbed by an animal desiring to drink.

As shown in Figure 1, the outside of the valve member or body 8 may be knurled at 21 to facilitate insertion thereof into pipe 7, or, as particularly indicated in broken lines in Figure 4, the shape of this member may be hexagonal, as indicated at 22, for engagement with a wrench, if this is considered necessary for insertion.

Obviously, the invention is susceptible of certain modifications which are quite practical, as for example shown in Figures 5 and 6. In this form of the invention, the valve body 23 largely resembles the previously-described valve body 8 in having an enlarged lower end which may be cylindrical, hexagonal or of any other practical form, and in similar fashion has a limited recess 24 forming a counterbore which terminates in a substantially flat shoulder 25 forming a stop for the contact head or member 9 of the plunger upon which the previously-described rod 18 is fixed and extends upwardly through the hole 26 in the valve body 23, the upper part of the plunger or rod 18 having the valve head 19 as already described engaging normally against or upon the valve seat 27 upon the upper end of valve member or body 23 to close the water-supply duct or hole 26 through which the rod 18 extends. The intermediate portion 28 of valve body 23 is reduced and terminates upwardly beneath the valve seat 27 in a groove or further reduced portion 29 in order to receive a resilient rubber or plastic sleeve 30 thereon, the latter being preferably a section of rubber tubing or the like which forms a tight fit upon the cylindrical reduced portion or neck 28 and also sloping inward to occupy the grooved portion 29 beneath the valve seat or head 27 on the upper end of valve body 23. The purpose of the resilient sleeve 30 is to provide an alternative means for inserting the valve in the pipe 7 so that threads will not be required, but rather a smooth hole 31 is all that is required in the pipe 7 and the fixture 23 is merely thrust up into the same to form a tight fit therein. Due to the restricted form of the sheath or sleeve 31 where it projects inwardly into the grooved portion 29, the advance portion or end thereof will not engage with or bunch up when introducing the valve into the hole 31 in pipe 7, but will instead allow the sleeve to smoothly enter this hole and cause the valve structure to be well seated therein up to the external shoulder 32 of the fixture.

The valve head 19 may be held on the upper end of plunger or rod 18 by friction or a pin may be used to hold it in place. The upper end of rod 18 may also be threaded, if desired, and the valve head screwed thereon.

The two forms of the invention described above operate in substantially the same manner, namely, that by contact of the beak of a fowl or the mouth of a small animal with the contact member of the head 9, the valve plunger is lifted or disturbed sufficiently to unseat the upper valve head 19 from contact with the valve seat 13 or 27 upon the upper end of the valve body allowing water to trickle down past the valve rod 18 in hole 16 or 26 to appear as globules or drops of water upon the contact head 9, where it may be sucked or licked off by the fowl or animal involved.

Manifestly, variations may be resorted to and other modifications may be introduced and parts and features may be further modified or used without others within the scope of the appended claims.

Having now fully described my invention, I claim:

1. A poultry-watering device or valve including a valve body having an upwardly-extending counterbore or recess in the bottom thereof and having a reduced portion upon the upper end terminating in a convex frusto-conical valve seat, said valve body and reduced portion having a longitudinal hole or bore extending therethrough from the counterbore or recess to the upper end of said valve seat, a thread upon the reduced portion for engaging in a threaded hole in the wall of a water pipe in a position to project said valve seat within the pipe, a valve plunger extending up through the longitudinal bore in said valve body and having an enlarged head forming a contact member upon the lower end thereof occupying a portion of the recess or counterbore in the bottom of the valve body and being of smaller cross-section than that of said recess, the contact member being of greater length than the depth of said recess and rounded at the lower end, and a concave conical valve head fixed upon the upper end of said valve plunger normally resting upon the frusto-conical valve seat by the effect of gravity upon said plunger with its contact member and valve head, the longitudinal bore through the valve body being of greater diameter than that of said valve plunger.

2. A poultry-watering device or valve including a valve body having an upwardly-extending counterbore or recess in the bottom thereof and having a reduced portion upon the upper end terminating in a convex frusto-conical valve seat, the reduced portion being substantially smooth upon the exterior thereof and beneath said valve seat having an annular groove further reducing the same at that point, said valve body and reduced portion having a longitudinal hole or bore extending therethrough from the counterbore or recess to the upper end of said valve seat, a sleeve of resilient elastic material mounted upon the reduced portion and groove thereof for engaging in a hole in the wall of a water pipe in a position to project the valve seat within the pipe, a valve plunger extending up through the longitudinal bore in said valve body and having an enlarged head forming a contact member upon the lower end thereof occupying a portion of the recess or counterbore in the bottom of the valve body and being of smaller cross-section than that of said recess, the contact member being of greater length than the depth of said recess and being rounded at the lower end, and a concave conical valve head fixed upon the upper end of said valve plunger normally resting upon the frusto-conical valve seat by the effect of gravity upon said plunger with its contact member and valve head, and the longitudinal bore through the valve body being of greater diameter than that of said valve plunger.

3. An automatic poultry-watering device or valve including a valve body having an upwardly-extending counter-bore or recess in the bottom thereof terminating in a shoulder and having a reduced portion upon the upper end of said valve body terminating in a convex and upwardly-directed frusto-conical valve seat, said valve body and reduced portion having a longitudinal hole or bore of uniform transverse diameter throughout the length thereof extending through said reduced portion from the counterbore or recess to the upper end of said frusto-conical valve seat, means upon the reduced portion beneath said frusto-conical valve seat for engaging with the sides of a hole in the wall of a water pipe in a position to project said valve seat a distance radially within the pipe through the hole in the wall thereof, a valve plunger of uniform cross-section throughout the length thereof extending up through the longitudinal bore in said valve body and having an enlarged head fixed thereon forming a contact member upon the lower end of the same occupying a portion of the recess or counterbore in the bottom of the valve body, the head being rounded at the lower end and at the upper end forming a substantially square shoulder, and a concave conical valve head fixed upon the upper end of said valve plunger normally resting upon the frusto-conical valve seat under the effect of gravity upon said plunger with its contact member and valve head in such position that the concave conical valve head substantially surrounds the upper portion of the frusto-conical valve seat, and the longitudinal bore through the valve body being of greater transverse diameter than that of said valve plunger.

KENNETH E. BECKLEY.

REFERENCES CITED

The following references are of record in the file of this patent:

UNITED STATES PATENTS

| Number | Name | Date |
| --- | --- | --- |
| 1,903,767 | Karst | Apr. 18, 1933 |
| 1,918,566 | Sadleir | July 18, 1933 |
| 2,307,220 | Hewitt | Jan. 5, 1943 |
| 2,319,928 | Hart | May 25, 1943 |